United States Patent
Heck et al.

(10) Patent No.: US 6,212,198 B1
(45) Date of Patent: *Apr. 3, 2001

(54) METHOD OF TRANSMITTING CONTROL DATA OR SOURCE DATA IN A FORMAT NOT DEPENDENT ON A FORMAT USED FOR THE COMMON TRANSMISSION OF CONTROL DATA AND SOURCE DATA

(75) Inventors: Patrick Heck, Durmersheim; Herbert Hetzel, Weingarten, both of (DE)

(73) Assignee: Becker GmbH, Karlsbad-Itterbach (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/597,478

(22) Filed: Feb. 2, 1996

(30) Foreign Application Priority Data

Feb. 2, 1995  (DE) ............................... 195 03 207

(51) Int. Cl.$^7$ ................................. H04J 3/16; H04J 3/12
(52) U.S. Cl. ............................. 370/465; 370/522
(58) Field of Search ..................... 370/452, 450, 370/460, 461, 462, 433, 432, 522, 503, 508, 510, 512, 514, 520; 359/108, 118, 119, 126

(56) References Cited

U.S. PATENT DOCUMENTS

| | | | |
|---|---|---|---|
| 4,460,944 | * | 7/1984 | Scanlon et al. .................... 370/88 |
| 4,879,714 | * | 11/1989 | Maeno ............................. 370/85.7 |
| 5,485,459 | * | 1/1996 | Van Steenbrugge .............. 370/85.4 |
| 5,844,953 | * | 12/1998 | Heck et al. ....................... 370/522 |

* cited by examiner

*Primary Examiner*—Chau Nguyen
*Assistant Examiner*—Chiho Andrew Lee
(74) *Attorney, Agent, or Firm*—Herbert L. Lerner; Laurence A. Greenberg; Werner H. Stemer

(57) ABSTRACT

A method for the common transmission of digital source and control data between data sources and sinks connected through data lines, includes transmitting the source and control data in a format prescribing a clocked sequence of individual bit groups of equal length. In each bit group, at least one bit position is reserved for the transmission of unformatted data. The unformatted data are allocated bitwise to the reserved bit positions of successive bit groups and are associated with a certain data source/data sink as a function of the control data.

11 Claims, 1 Drawing Sheet

METHOD OF TRANSMITTING CONTROL DATA OR SOURCE DATA IN A FORMAT NOT DEPENDENT ON A FORMAT USED FOR THE COMMON TRANSMISSION OF CONTROL DATA AND SOURCE DATA

BACKGROUND OF THE INVENTION

Field of the Invention

The invention relates to a method for the common transmission of digital source and control data between data sources and sinks being connected through data lines, in which source and control data are transmitted in a format prescribing a clocked sequence of individual bit groups of equal length.

The present invention shows a network with ring-like architecture, in which subscribers forming data sources and data sinks are connected through a single data line. Through that data line, the source and control data are transferred in a continuous data stream which is synchronous to a clock signal. The clock signal is generated by a single subscriber. All other subscribers synchronize themselves to the clock signal. Purely asynchronous data transmission methods have to be differentiated therefrom as packet or package-oriented data transmission methods, for example ATM-methods.

Such methods are used wherever different electrical and electronic devices that are intended to exchange information with one another are linked to one another through the use of data lines in what is sometimes a complicated way. In the audio field, for instance, communication between interlinked data sources on one hand, such as CD players, radio receivers and cassette tape recorders, and the data sinks connected with them on the other hand, such as amplifier-speaker combinations, can be controlled by such a method.

In the course of development of CD players, the so-called SPDIF format (Sony/Philips Digital Interface Format), which is also known by the designation IEC 958, has become established as the standard. That format prescribes transmission of the data in a frame that includes two subframes or bit groups. Each subframe includes a preamble of four bits for control data, followed by 24 bits for source data and ending with four bits for special control data. One subframe of each frame is assigned to the left audio channel, and the other subframe is assigned to the right audio channel.

Since the rigid structure of that format has proved to be disadvantageous for data transmission in complex communications systems, co-pending U.S. application Ser. No. 08/595,838 now U.S. Pat. No. 5,844,953) entitled "Method for Common Transmission of Digital Source and Control Data Between Data Sources and Data Sinks Connected through Data Lines" has been filed simultaneously with the instant application, in which a substantially more-flexible format for data transmission is described.

Fundamentally, all of those methods have in common the fact that both source and control data must be converted into a fixedly specified format prior to transmission. On one hand, that can be time-consuming and can cause unacceptable delays in time-critical applications. On the other hand, with a specified transmission format, only control data that are defined for transmission with that format, or in other words that are contained in the "instruction set" of the particular transmission format, which set includes the individual control data, can be transmitted. Moreover, the length of the data words that can be transmitted is restricted by the length of the individual bit groups.

SUMMARY OF THE INVENTION

It is accordingly an object of the invention to provide a method for the common transmission of digital source and control data between data sources and data sinks connected through data lines, which overcomes the hereinafore-mentioned disadvantages of the heretofore-known methods of this general type and with which data of an arbitrary type and length can be transmitted quickly and flexibly from one device to another.

With the foregoing and other objects in view there is provided, in accordance with the invention, a method for the common transmission of digital source and control data between data sources and sinks being connected through data lines, which includes transmitting the source and control data in a format prescribing a clocked sequence of individual bit groups of equal length, which comprises reserving at least one bit position in each bit group for the transmission of unformatted data, allocating the unformatted data bitwise to the reserved bit positions of successive bit groups, and assigning the unformatted data to a certain data source/data sink as a function of the control data.

On one hand, data of arbitrary length can be transmitted through the use of the unformatted transmission of the data at reserved bit positions of successive bit groups. On the other hand, no conversion of the data to a structure adapted to the transmission format takes place, thus eliminating a time lag in transmission caused by conversion. Moreover, control data that are not contained in the transmission format "instruction set" which includes the individual control data can also be transmitted. These control data, which are unknown to the transmission format, are associated with one or more specific receiving devices as a function of the "regular" control data of the transmission format and are evaluated directly by these devices.

The method is not limited to the transmission of audio data. It can also be used to transmit arbitrary data, such as fax data, status data, telephone card data or other control data. For instance, besides the audio devices mentioned at the outset, video cameras, video-CD players, telephones, fax machines, microphones, CD-ROMs, or computer hard disks can be linked together. Furthermore, particularly in motor vehicles, control and monitoring units can also be included in the network. For example, it is possible to incorporate devices for monitoring the function of outside lights or tire pressure or of devices for measuring or controlling engine rpm or charge pressure of a turbocharger. In this way, if the tire pressure is dropping, for instance, the audio system can issue a warning in the form of a memorized text over the speaker.

In accordance with another mode of the invention, at the beginning of transmission of unformatted data each time, a starting identification code is transmitted as a control datum. Thus the start of the unformatted data is apparent to each receiver in a simple way.

In accordance with a further mode of the invention, at the beginning of transmission of unformatted data each time, the length of the unformatted data sequence is transmitted as a control datum. In this way, the end of the unformatted data can be determined for each receiver in a simple way.

In accordance with an added mode of the invention, at the end of transmission of unformatted data each time, an ending identification code can be transmitted as a control datum, so that in this way the end of the unformatted data is identified. If not only the starting identification code and the length but also an ending identification code are transmitted, then the redundant information can be used to detect transmission errors.

In accordance with an additional mode of the invention, each data sink is assigned a unique address, and at the beginning of the transmission of unformatted data each time, the address of the data sink for which the unformatted data are intended is transmitted as a control datum. The corresponding data sink can thus tell from the transmitted address that it is the receiver of the unformatted data, and begins with the readout of these data.

If the unformatted data are intended for various data sinks in common, then advantageously at the beginning of the transmission the addresses of these data sinks intended as receivers are transmitted as control data.

In accordance with yet another mode of the invention, and in particular in addition, each data source is assigned a unique address, and at the beginning of the transmission of unformatted data each time, the address of the data source which outputs the unformatted data is transmitted as a control datum.

If the data of a certain data source are always to be transmitted to the same data sinks, then these data sinks can tell from the transmitted address of the data source that they are intended as receivers of the unformatted data.

In a transmission of the address of the data sink, it can also be useful to transmit the address of the data source simultaneously as well. In this way, the data sink can tell from which data source the data have been transmitted to it. The control data, such as the starting identification code, ending identification code and length or address of the data source/ data sink, which are required for the association and evaluation of the unformatted data, can each be stored entirely within one bit group. Alternatively, however, similarly to the transmission of the unformatted data, they can be split up and stored in check bits provided for that purpose in a plurality of successive bit groups. It is also possible for these control data to be stored at the onset of transmission of the unformatted data in the bit positions reserved for the transmission of that unformatted data.

In accordance with yet a further mode of the invention, optical fibers and/or electric lines are used as the data lines. Particularly when optical fibers are used, data transmission at very high speed is possible. Moreover, the use of optical fibers results in an especially low weight and therefore good usability particularly in mobile systems, such as in a motor vehicle.

In accordance with yet an added mode of the invention, the method is used in a communications system which includes a plurality of subscribers connected to one another through a network that in particular is ring-like in form, for the unformatted transmission of data from one subscriber to another subscriber through the network. In this way, data generated in a first subscriber can be transmitted unformatted over the network to a second subscriber, by which they are read out and in which they perform a desired function. For example, data generated by pressing a playback key of a CD player can be transmitted unformatted over the network to a cassette tape recorder, by which they are read out and in which they trip a synchronized start of recording.

The two network subscribers need not necessarily be connected directly with one another. The unformatted data can instead be looped through intervening subscribers that are not intended as receivers.

In accordance with yet an additional mode of the invention, the method involves a mobile communications system, in particular a communications system in a motor vehicle. Especially given the rising number of electronic devices used in a motor vehicle and the necessary communications between these devices, it can be quite advantageous to use the method of the invention.

In accordance with a concomitant mode of the invention, the method can involve a stationary communications system, in particular a communications system in the home. This so-called multimedia network system can then be made up of the most varied audio and video components, and components that generate and/or process control data and other data.

One advantage of the method of the invention is that data of an arbitrary type can be transmitted very fast and flexibly between the various subscribers of a communications system. In particular, data of arbitrary length as well as control data that are not present in the transmission format "instruction set", which includes the individual control data, can also be transmitted.

Other features which are considered as characteristic for the invention are set forth in the appended claims.

Although the invention is illustrated and described herein as embodied in a method for the common transmission of digital source and control data between data sources and data sinks connected through data lines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
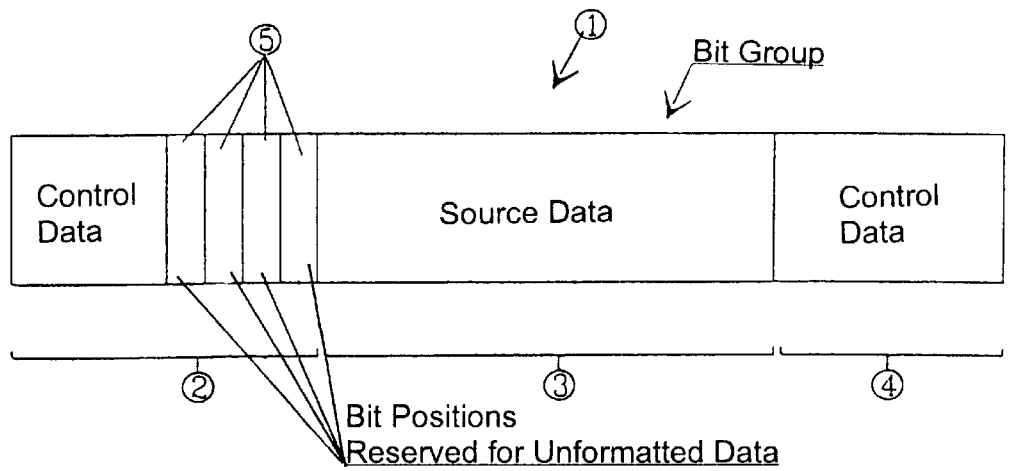
FIG. 1 is a diagrammatic view of a bit group illustrating a distribution of source and control data in a transmission with a format in accordance with the method of the invention.

Referring now to the figures of the drawing in detail and first, particularly, to FIG. 1 thereof, there is seen a bit group 1, which represents the smallest unit of a data format that is usable for the transmission of digital data. The bit group 1 is subdivided into a first region 2 for control data, a region 3 for source data, and an adjoining second region 4 for further control data.

The first region 2 includes four bit positions 5, which are reserved for the transmission of unformatted data.

Figure 2:
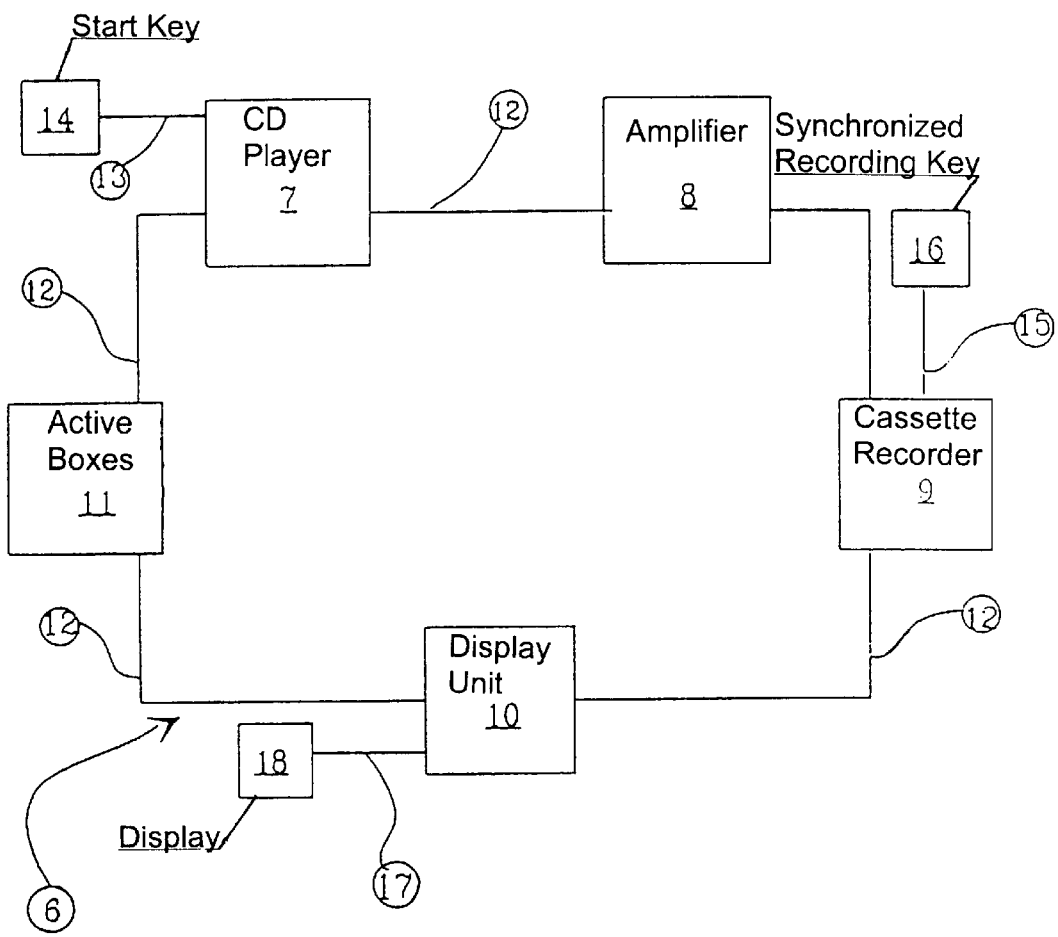
FIG. 2 is a schematic circuit diagram of a network including a number of components connected through individual line segments, in which a transmission of data between various components can be carried out by the method of the invention.

FIG. 2 shows a ring-like communications system 6, which includes components 7, 8, 9, 10, 11. The components 7, 8, 9, 10, 11 communicate with one another through optical fiber segments 12. Specifically, the components 7, 8, 9, 10, 11 are a CD player 7, an amplifier 8, a cassette tape recorder 9, a display unit 10 and active boxes 11.

The CD player 7 has a serial input 13 which can be triggered through a start key 14, so that when the start key 14 is pressed, the playback of an inserted CD begins.

The cassette recorder 9 has a serial input 15 which can be triggered through a synchronized recording key 16. Through the use of the synchronized recording key, the cassette recorder 9 can be put into synchronized recording readiness, the function of which will be described in further detail below.

The display unit 10 has a serial output 17, by way of which a display 18 can be triggered.

In order to transmit audio data, for instance from the CD player 7 to the amplifier 8 over the optical fiber segment 12, the data to be transmitted are formatted in accordance with a chosen transmission format and are output in chronologically successive bit groups 1 by the CD player 7.

The method according to the invention can be used as described below, in order to start recording at the cassette recorder 9 synchronously with playback of the CD, by way of example:

Before playback of the CD is started, the synchronized recording key 16 of the cassette recorder 9 is actuated, thus putting the recorder into synchronized recording readiness.

Upon actuation of the start key 14 of the CD player 7, the CD player generates control data. These data are allocated bitwise, unformatted, to the bit positions 5 of successive bit groups 1, which are output by the CD player 7.

Simultaneously, at the beginning of transmission of the unformatted data, the addresses of the cassette recorder 9 and the display unit 10 are stored, along with a starting identification code and a length of an unformatted data sequence, in the second region 4 which is reserved for control data and is part of the first bit group 1.

The successive bit groups 1 are transmitted over the optical fiber segment 12 to the amplifier 8, where audio data stored in the regions 3 of the bit groups 1 are processed. The unformatted data assigned to the bit positions 5 are not used by the amplifier 8, because the amplifier is not identified by the address data stored in the second region 4 as the receiver of these unformatted data.

Once the bit groups 1 have been transmitted to the cassette recorder 9 over the next optical fiber segment 12, the cassette recorder recognizes from the address data stored in the second region 4 that it is intended as the receiver of the unformatted data. The cassette recorder 9 thereupon reads out the unformatted control data assigned to the bit positions 5 in accordance with the starting identification code and length, which are also stored in the second region 4, and interprets them as an internal control signal for starting the synchronized recording. In this way, recording at the cassette recorder 9 automatically begins when playback by the CD player 7 is started through the start key 14.

Since not only the address of the cassette recorder 9 but also the address of the display unit 10 is stored in the second region 4 of the first transmitted bit group 1, the display unit 10, after receiving the bit groups 1, recognizes that it is likewise intended as a receiver of the unformatted data assigned to the bit groups 5. The unformatted data are therefore read out by the display unit 10 in accordance with the starting identification code and the length and are interpreted as internal control data. In this way, for example when playback of the CD begins, an indication "CD synchronized recording" can be shown on the display 18.

We claim:

1. In a method for the common transmission of digital source and control data between data sources and sinks connected through data lines, which includes converting the source and control data into a given transmission format prescribing a clocked sequence of individual bit groups of equal length in a continuous data stream synchronized to a common clock signal for forming formatted data, the improvement which comprises:

reserving at least one bit position in each bit group for inserting unformatted data, allocating the unformatted data bitwise to the reserved bit positions of successive bit groups, assigning the unformatted data to a certain data source/data sink as a function of a separate control datum, and transmitting, within the individual bit groups, the formatted data and the unformatted data.

2. The method according to claim 1, which comprises transmitting a starting identification code as a control datum each time at a beginning of a transmission of the unformatted data.

3. The method according to claim 1, which comprises transmitting a length of an unformatted data sequence as a control datum each time at a beginning of a transmission of the unformatted data.

4. The method according to claim 1, which comprises transmitting an ending identification code as a control datum each time at an end of a transmission of the unformatted data.

5. The method according to claim 1, which comprises assigning a unique address to each data sink, and transmitting the address of the data sink for which the unformatted data are intended as a control datum each time at a beginning of a transmission of the unformatted data.

6. The method according to claim 1, which comprises assigning a unique address to each data source, and transmitting the address of the data source outputting the unformatted data as a control datum each time at a beginning of a transmission of the unformatted data.

7. The method according to claim 1, which comprises transmitting the digital source and control data through at least one of optical fibers and electric lines being used as the data lines.

8. In a method for the common transmission of digital source and control data between a plurality of subscribers connected through a network in a communications system, for an unformatted transmission of data from one subscriber to another subscriber through the network, which includes converting the source and control data into a given transmission format prescribing a clocked sequence of individual bit groups of equal length in a continuous data stream synchronized to a common clock signal for forming formatted data, the improvement which comprises:

reserving at least one bit position in each bit group for inserting unformatted data, allocating the unformatted data bitwise to the reserved bit positions of successive bit groups, assigning the unformatted data to a certain subscriber as a function of a separate control datum, and transmitting, within the individual bit groups, the formatted data and the unformatted data.

9. The method according to claim 8, which comprises connecting the subscribers in a ring-like network.

10. In a method for the common transmission of digital source and control data between a plurality of subscribers connected through a ring-like network in a mobile communications system for an unformatted transmission of data from one subscriber to another subscriber through the network, which includes converting the source and control data into a given transmission format prescribing a clocked sequence of individual bit groups of equal length in a continuous data stream synchronized to a common clock signal for forming formatted data, the improvement which comprises:

reserving at least one bit position in each bit group for inserting unformatted data, allocating the unformatted data bitwise to the reserved bit positions of successive bit groups, assigning the unformatted data to a certain subscriber as a function of a separate control datum, and transmitting, within the individual bit groups, the formatted data and the unformatted data.

11. In a method for the common transmission of digital source and control data between a plurality of subscribers connected through a ring-like network in a stationary communications system for an unformatted transmission of data from one subscriber to another subscriber through the network, which includes converting the source and control data into a given transmission format prescribing a clocked sequence of individual bit groups of equal length in a continuous data stream being synchronized to a common clock signal for forming formatted data, the improvement which comprises:

reserving at least one bit position in each bit group for inserting unformatted data, allocating the unformatted data bitwise to the reserved bit positions of successive bit groups, assigning the unformatted data to a certain subscriber as a function of a separate control datum, and transmitting, within the individual bit groups, the formatted data and the unformatted data.

* * * * *